(12) United States Patent
Remmler

(10) Patent No.: US 8,166,841 B2
(45) Date of Patent: May 1, 2012

(54) MANUAL TRANSMISSION FOR A MOTOR VEHICLE

(75) Inventor: Mathias Remmler, Mauchenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 12/431,138

(22) Filed: Apr. 28, 2009

(65) Prior Publication Data
US 2009/0266191 A1 Oct. 29, 2009

(30) Foreign Application Priority Data
Apr. 28, 2008 (DE) .......................... 10 2008 021 134

(51) Int. Cl.
*F16H 3/08* (2006.01)
(52) U.S. Cl. ............................................. 74/330; 74/331
(58) Field of Classification Search .................... 74/325, 74/329, 330, 331, 339, 340
See application file for complete search history.

(56) References Cited

U.S. PATENT DOCUMENTS

| | | | | |
|---|---|---|---|---|
| 2,572,480 A | * | 10/1951 | Hoffman | 74/359 |
| 2,615,349 A | * | 10/1952 | Winther | 477/123 |
| 2,897,690 A | * | 8/1959 | Maier | 74/720 |
| 2,899,034 A | * | 8/1959 | Hubert | 192/48.8 |
| 3,149,498 A | * | 9/1964 | Mack | 74/364 |
| 4,738,149 A | | 4/1988 | Janiszewski | |
| 5,383,375 A | * | 1/1995 | Ogawa et al. | 74/330 |
| 5,603,242 A | * | 2/1997 | Krieger | 74/335 |
| 6,840,881 B2 | * | 1/2005 | Ma et al. | 475/203 |
| 6,843,748 B2 | * | 1/2005 | Ma et al. | 475/221 |
| 7,080,566 B2 | * | 7/2006 | Baldwin et al. | 74/331 |
| 7,210,367 B2 | * | 5/2007 | Akutagawa | 74/340 |
| 7,231,843 B2 | * | 6/2007 | Gumpoltsberger et al. | 74/329 |
| 7,267,022 B2 | * | 9/2007 | Gumpoltsberger et al. | 74/331 |
| 7,272,985 B2 | * | 9/2007 | Gumpoltsberger et al. | 74/331 |
| 7,437,964 B2 | * | 10/2008 | Gitt | 74/330 |
| 7,469,609 B2 | * | 12/2008 | Baldwin | 74/330 |
| 7,540,823 B2 | * | 6/2009 | Kilian et al. | 477/3 |

(Continued)

FOREIGN PATENT DOCUMENTS
DE 3610269 A1 10/1986
(Continued)

OTHER PUBLICATIONS

British Patent Office, British Search Report for Application No. 0905822.3, dated Jul. 31, 2009.

*Primary Examiner* — Roger L Pang
*Assistant Examiner* — Michael Gonzalez
(74) *Attorney, Agent, or Firm* — Ingrassia Fisher & Lorenz, P.C.

(57) ABSTRACT

A transmission for a motor vehicle is provided that includes, but is not limited to, a drive shaft and at least two countershafts which can be driven by the drive shaft with opposite rotational directions. A first one of the countershafts carries a hollow shaft which can be fixed to the first countershaft and on which a first driven gearwheel is rotationally fixed. Further, on the hollow shaft, a second gearwheel is rotatably attached which meshes with a fixed gearwheel of the second countershaft. A selector sleeve is rotationally fixed on the hollow shaft and is displaceable between an engagement position at a selector gearing of the second gearwheel and an engagement position at a selector gearing of the first countershaft.

9 Claims, 1 Drawing Sheet

U.S. PATENT DOCUMENTS

| | | |
|---|---|---|
| 2005/0247147 A1* | 11/2005 | Gumpoltsberger et al. .... 74/325 |
| 2006/0054441 A1 | 3/2006 | Ruedle |
| 2007/0209461 A1 | 9/2007 | Baldwin et al. |
| 2007/0277633 A1 | 12/2007 | Burgardt et al. |
| 2008/0247147 A1* | 10/2008 | Horng .......................... 361/818 |
| 2009/0065283 A1 | 3/2009 | Suzuki |

FOREIGN PATENT DOCUMENTS

| | | |
|---|---|---|
| DE | 102004043939 A1 | 4/2006 |
| DE | 102004056936 A1 | 6/2006 |
| EP | 1077336 A1 | 2/2001 |
| EP | 2036757 A2 | 3/2009 |
| WO | 2011082743 A1 | 7/2011 |

* cited by examiner

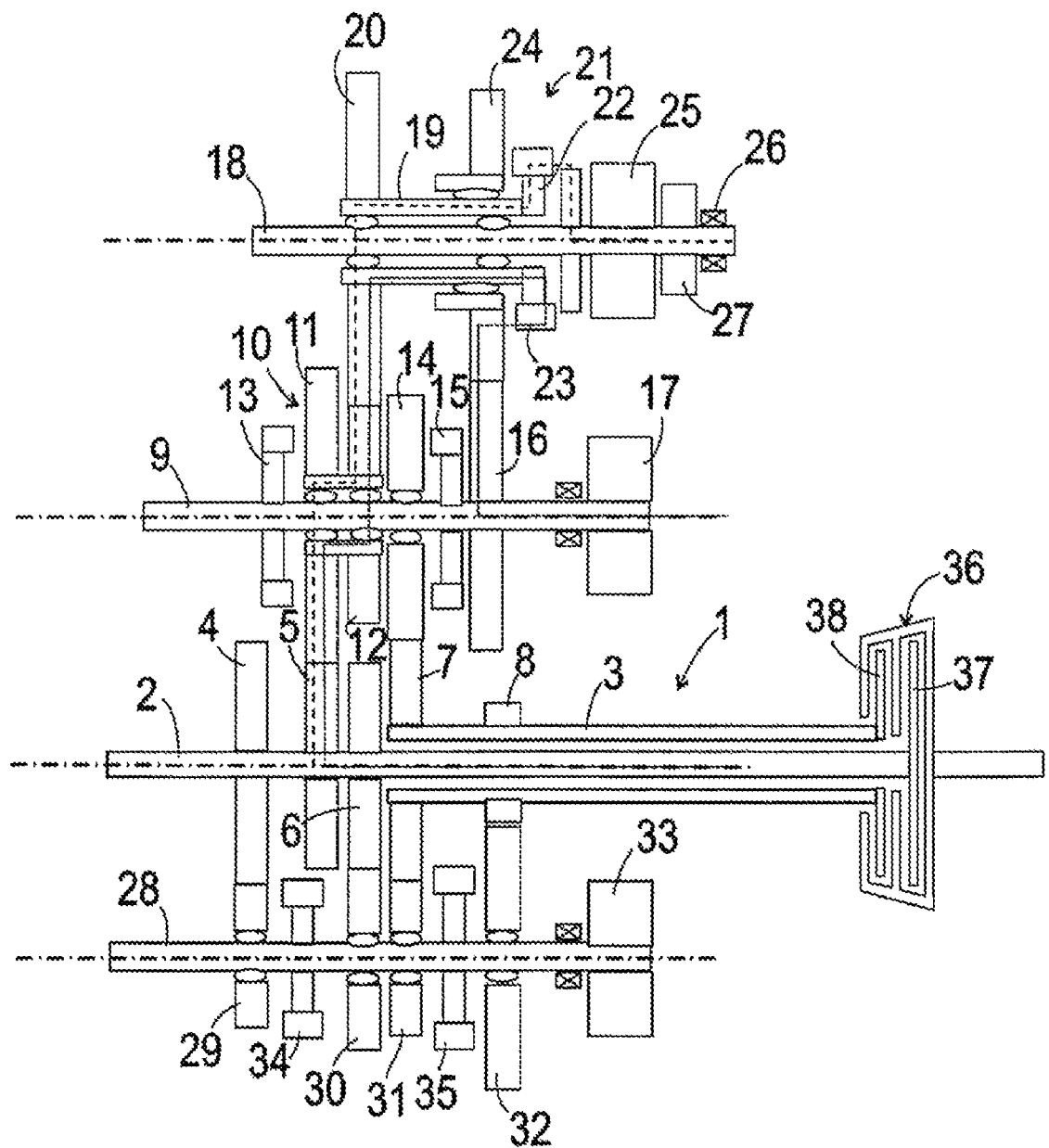

MANUAL TRANSMISSION FOR A MOTOR VEHICLE

CROSS-REFERENCE TO RELATED APPLICATION

This application claims priority to German Patent Application No. 102008021134.6, filed Apr. 28, 2008, which is incorporated herein by reference in its entirety.

TECHNICAL FIELD

The present invention relates to a transmission for a motor vehicle with a drive shaft and at least two countershafts which can be driven with opposite rotational directions for performance of forward and reverse gears. In such a transmission, the drive shaft is generally more densely packed with gearwheels than countershafts so that for lack of space it is preferred to equip the drive shaft with fixed gearwheels and the countershaft with idler gearwheels and with clutches for selectively fixing the idler gearwheels to the countershafts.

BACKGROUND

In a transmission, when the torque flow in the reverse gear and in the first forward gear runs through different countershafts, to shift between the reverse gear and the first gear a clutch has to be opened at one of the countershafts, and at the other one, a clutch has to be closed. Each time a shift between the first gear and the reverse gear occurs, a noticeable interruption of the torque flow occurs. This is in particular troublesome when the wheels are sunk into loose ground and an attempt is made to initiate the vehicle, by quick shifting between forward and reverse gear, to perform a reciprocating movement, the amplitude of which finally becomes high enough for the wheels to get out of the ruts in the grounds. Such a release maneuver is only possible when the time of the shifting operation between forward and reverse gear is considerably shorter than the period of the reciprocating movement of the vehicle in the rut.

It is hence at least one object of the present invention to develop a manual transmission with a drive shaft and at least two countershafts drivable in opposite directions in such a manner that the time period required for shifting between a forward and a reverse gear is minimized.

SUMMARY

The at least one object is solved in that, in a transmission of the type mentioned above, in which a first one of the countershafts carries a hollow shaft which can be fixed to the first countershaft and on which a first driven gearwheel is rotationally fixed, on the hollow shaft further a second gearwheel is rotatably attached which meshes with a fixed gearwheel of the second countershaft, and in that on the hollow shaft a selector sleeve is rotationally fixed and is displaceable between an engagement position at a selector gearing of the second gearwheel and an engagement position at a selector gearing of the first countershaft.

This selector sleeve allows the shifting between a forward and a reverse gear by means of a single continuous movement between its two engagement positions. Hence, only one single selector sleeve is involved in the switching operation, which shortens the shifting operation and simplifies its control.

The second gearwheel and the fixed gearwheel have preferably substantially the same diameter to substantially realize opposite equal transmission ratios of the forward and the reverse gear. An exact numeric equality of the transmission ratios is not to be required; however, preferably, a percentage difference between them is considerably smaller between these two gears on the one hand and any other gear of the transmission on the other hand.

The first gearwheel is preferably driven by means of a stepped gearwheel rotatable on the second countershaft. The stepped gearwheel allows a high gear reduction between the drive shaft and the first countershaft without requiring a gearwheel set which has considerably different gearwheel diameters and which involves heavy constraints with respect to the dimensioning of the transmission, the distances between the shafts, etc.

The stepped gearwheel can preferably also be fixed to the second countershaft so as to represent a further gear.

In order to be able to realize a high number of gears at a small construction length of the transmission, preferably a third countershaft is to be provided. In a space-saving design, the first gearwheel is arranged axially overlapping a gearwheel pair on the drive shaft and the third countershaft.

Also the second gearwheel and the fixed gear wheel can advantageously axially overlap a gearwheel pair on the drive shaft and the third countershaft.

The drive shaft can be divided in two coaxial partial shafts which can be rotated with respect to each other, to each of which a torque from an engine can be applied independently from one another. When one of the two partial shafts is a hollow shaft through which the other partial shaft extends, clutches for both partial shafts can be arranged on a same side of the transmission.

Generally, in such a design the clutch, which drives the hollow shaft which has an opening through which the other shaft extends, is located closer to the transmission than the clutch which drives the solid shaft, and that therefore the diameter of the hollow shaft is more limited by a differential driven by means of the output shaft than the diameter of the solid shaft. The solid shaft is hence higher loadable. Since high loads occur primarily during the operation in those two gears between which the selector sleeve on the hollow shaft of the first countershaft shifts, this hollow shaft is preferably driven by means of the other partial shaft.

Preferably, one of the partial shafts, respectively, drives even-numbered gears and the other partial shaft drives odd-numbered gears. This provides the possibility, while a gear is engaged, to pre-select an adjacent gear on the respective other partial shaft and to execute the shifting between the gears by transferring the torque flow from one partial shaft to the other one.

BRIEF DESCRIPTION OF THE DRAWINGS

The present invention will hereinafter be described in conjunction with the following drawing FIGURES, wherein like numerals denote like elements, and.

FIG. 1 is a schematic illustration of a manual transmission according to an embodiment of the invention.

DETAILED DESCRIPTION

The following detailed description is merely exemplary in nature and is not intended to limit application and uses. Furthermore, there is no intention to be bound by any theory presented in the preceding background and summary or the following detailed description.

A drive shaft 1 of the shown manual transmission comprises a central solid shaft 2 which extends over the entire axial extension of the transmission, and a hollow shaft 3 which encloses the solid shaft 2 over a portion of its length. The solid shaft 2 and the hollow shaft 3 can be coupled selectively and independent from each other to the engine of a motor vehicle by means of a dual clutch 36. The clutch disks 37 of the dual clutch 36, which drive the solid shaft 2, have a larger surface area than the ones 38 which drive the hollow shaft 3 and therefore can be loaded higher.

The solid shaft 2 carries the fixed gearwheels 4, 5, 6; the hollow shaft is provided with the fixed gearwheels 7, 8.

A first countershaft 9 carries a stepped gearwheel 10 with gear rims 11, 12, which the stepped gearwheel can be fixed by means of a locking synchronization device 13 to the shaft 9. The bigger one of the two gear rims 11 meshes with the middle fixed gearwheel 5 of the solid shaft 2. The smaller gear rim 12 lies in the same radial plane as the fixed gearwheel 6 without meshing with it.

Next to the stepped gearwheel 10, an idler gearwheel 14 is arranged on the countershaft 9, which the idler gearwheel can be fixed to the shaft 9 by means of a one-sided acting locking synchronization device 15. Beyond the locking synchronization device 15, a fixed gearwheel 16 and an output pinion 17 are located, the output pinion meshing with a gear rim of a not-shown differential.

A second countershaft 18 carries a rotatable hollow shaft 19 to which a gearwheel 20 and a synchronizer body 22 of a further locking synchronization device 21 is mounted. The gearwheel 20 meshes with the smaller gear rim 12 of the stepped gearwheel 10. A selector sleeve 23 of the locking synchronization device 21 is displaceable from a neutral position shown in the FIGURE in opposite directions to couple the hollow shaft either to an idler gearwheel 24 carried by the hollow shaft or to the countershaft 18. Also the countershaft 18 is provided with an output pinion 25 which meshes with the gear rim of the differential. Furthermore, between the output pinion 25 and a bearing 26 which supports the countershaft 18 on a not-shown housing of the transmission, a parking gearwheel 27 is provided as a fixed gearwheel at which, by means of the engagement of a not-shown ratchet, the entire transmission can be blocked.

The idler gearwheel 24 meshes with the fixed gearwheel 16 on the countershaft 9.

A third countershaft 28 is provided with four idler gearwheels 29, 30, 31, 32, an output pinion meshing with the differential, and two locking synchronization devices 34, 35 working in two directions, for selectively fixing one of the idler gearwheels 29 to 32 to the countershaft 28.

In the first gear of the transmission, the locking synchronization device 21 couples the idler gearwheel 24 to the hollow shaft 19, and the torque flow runs from the solid shaft 2, via the gearwheel 5, the stepped gearwheel 10, and the gearwheels 20, 24, 16 to the countershaft 9.

In the second gear, the locking synchronization device 35 is in engagement with the idler gearwheel 32, and the torque flow runs from the hollow shaft 3 via the gearwheels 8, 32 to the countershaft 28.

In the third gear, the locking synchronization device 13 locks the stepped gearwheel 10 on the countershaft 9, and the torque flow runs from the solid shaft 2 via the gearwheel 5 and the gear rim 11 to the countershaft 9.

In the fourth gear, the torque flows from the hollow shaft 3 via the gearwheel 7 and the idler gearwheel 14 fixed by means of the locking synchronization device 15 to the countershaft 9.

A fifth gear is obtained in that the locking synchronization device 34 fixes the idler gearwheel 30 so that the torque can flow from the solid shaft 2 via the gearwheels 6, 30 to the countershaft 28.

The sixth gear is obtained like the fourth one with involvement of the gearwheel 7 of the hollow shaft 3 in that the locking synchronization device 35 fixes the idler gearwheel 31 to the countershaft 28.

In the seventh gear, the torque flow runs from the solid shaft 2 via the gearwheel 4 and the gearwheel 29 fixed by the locking synchronization device 34 to the countershaft 28.

Because in each shifting between two forward gears, two locking synchronization devices are involved, the shifting between the reverse gear and the first forward gear takes place exclusively with the aid of the locking synchronization device 21, and therefore requires only a short time.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A transmission for a motor vehicle, comprising:
a drive shaft; and
at least two countershafts that can be driven by the drive shaft with opposite rotational directions,
wherein a first one of the at least two countershafts carries a hollow shaft which can be fixed to the first one of the at least two countershafts and to which a first gearwheel is rotationally fixed,
wherein further on the hollow shaft, a second gearwheel rotatably attached which meshes with a fixed gearwheel of a second countershaft of the at least two countershafts, and that on the hollow shaft, a selector sleeve is rotationally fixed and is displaceable between an engagement position at a first selector gearing of the second gearwheel and a second engagement position at a second selector gearing of the first countershaft of the at least two countershafts,
wherein the first gearwheel is driven by a stepped gearwheel rotatable on the second countershaft.

2. The transmission according to claim 1, wherein the second gearwheel and the fixed gearwheel substantially have the same diameter.

3. The transmission according to claim 1, further comprising a plurality of forward gears and at least one reverse gear, wherein a torque flow in a first gear of the plurality of forward gears and in the at least one reverse gear is directed through the hollow shaft of the first countershaft.

4. The transmission according to claim 1, wherein the stepped gearwheel is fixable to the second countershaft.

5. The transmission according to claim 1, wherein the drive shaft comprises at least two coaxial partial shafts which can be rotated with respect to each other.

6. The transmission according to claim 5, wherein a first coaxial partial shaft of the at least two coaxial partial shafts is a solid shaft and a second coaxial partial shaft of the at least two coaxial partial shafts is the hollow shaft enclosing the solid shaft, and the hollow shaft of the first countershaft is driven by the solid shaft.

7. The transmission according to claim 5, wherein a first coaxial partial shaft of the at least two coaxial partial shafts is adapted to drive at least one even-numbered gear and a second coaxial partial shaft of the at least two coaxial partial shafts is adapted to drive at least one odd-numbered gear.

8. A transmission for a motor vehicle, comprising:
a drive shaft; and
at least two countershafts that can be driven by the drive shaft with opposite rotational directions,
wherein a first one of the at least two countershafts carries a hollow shaft which can be fixed to the first one of the at least two countershafts and to which a first gearwheel is rotationally fixed,
wherein further on the hollow shaft, a second gearwheel rotatably attached which meshes with a fixed gearwheel of a second countershaft of the at least two countershafts, and that on the hollow shaft, a selector sleeve is rotationally fixed and is displaceable between an engagement position at a first selector gearing of the second gearwheel and a second engagement position at a second selector gearing of the first countershaft of the at least two countershafts,
wherein the first gearwheel is arranged axially overlapping a gearwheel pair on the drive shaft and a third countershaft.

9. A transmission for a motor vehicle, comprising:
a drive shaft; and
at least two countershafts that can be driven by the drive shaft with opposite rotational directions,
wherein a first one of the at least two countershafts carries a hollow shaft which can be fixed to the first one of the at least two countershafts and to which a first gearwheel is rotationally fixed,
wherein further on the hollow shaft, a second gearwheel rotatably attached which meshes with a fixed gearwheel of a second countershaft of the at least two countershafts, and that on the hollow shaft, a selector sleeve is rotationally fixed and is displaceable between an engagement position at a first selector gearing of the second gearwheel and a second engagement position at a second selector gearing of the first countershaft of the at least two countershafts,
wherein the second gearwheel and the fixed gearwheel are arranged axially overlapping a gearwheel pair on the drive shaft and a third countershaft.

* * * * *